United States Patent [19]
Rikiyama

[11] Patent Number: 5,313,500
[45] Date of Patent: May 17, 1994

[54] FRAME SYNCHRONIZATION CIRCUIT COMPRISING A SERIES-TO-PARALLEL CONVERTER

[75] Inventor: Hiroki Rikiyama, Tokyo, Japan
[73] Assignee: NEC Corporation, Tokyo, Japan
[21] Appl. No.: 735,732
[22] Filed: Jul. 25, 1991

[30] Foreign Application Priority Data
Jul. 25, 1990 [JP] Japan .................. 2-197559

[51] Int. Cl.$^5$ .............................. H04L 7/00
[52] U.S. Cl. ...................... 375/114; 375/116; 370/105.4
[58] Field of Search ............... 375/114, 115, 116; 370/105.1, 105.4, 105.5

[56] References Cited
U.S. PATENT DOCUMENTS

| | | | |
|---|---|---|---|
| 4,242,755 | 12/1980 | Gauzan | 375/116 X |
| 4,404,542 | 9/1983 | Thomas, Jr. | 375/116 X |
| 4,748,623 | 5/1988 | Fujimoto | 375/116 X |
| 4,879,731 | 11/1989 | Brush | 375/116 |
| 4,984,238 | 1/1991 | Watanabe et al. | 375/116 X |
| 5,058,141 | 11/1991 | Kem et al. | 375/116 |

OTHER PUBLICATIONS

Research Disclosure, No. 311, Mar. 1990, New York (US), p. 225, "Frame Synchronizer With Parallel Logic for Detecting Location of a Synch Character and Logic Circuits for Realigning Data in Two Adjacent Frames."

*Primary Examiner*—Stephen Chin
*Assistant Examiner*—Tesfaldet Bocure
*Attorney, Agent, or Firm*—Sughrue, Mion, Zinn, Macpeak & Seas

[57] ABSTRACT

A series-to-parallel converter (26) converts an input code sequence to first to N-th code sequences with input clocks frequency divided by N into circuit clocks, based on which a frame pulse is generated. Among concurrency detectors (41) which are supplied with the frame pulse in common and with detection signals produced when first to N-th synchronization patterns are detected in the respective code sequences and are for producing nonconcurrent results when the detection signals are nonconcurrent with the frame pulse, a particular detector produces an earliest concurrent result to disable other detectors when the frame pulse is concurrent with one of the detection signals that is supplied thereto. These other detectors are enabled when the particular detector produces a nonconcurrent result due to collapse of frame synchronism. Through an AND gate (43), the nonconcurrent results inhibit the circuit clocks.

8 Claims, 6 Drawing Sheets

FRAME SYNCHRONIZATION CIRCUIT COMPRISING A SERIES-TO-PARALLEL CONVERTER

BACKGROUND OF THE INVENTION

This invention relates to a frame synchronization circuit for use in a receiver of a digital communication system, which is typically a PCM communication system.

In a transmitter of a digital communication system, digital information signals are multiplexed into a multiplexed signal either on a word basis or on a frame basis. Usually, a frame synchronization pattern is inserted in the multiplexed signal at a frame period to have a predetermined pattern which does not appear in other parts of the multiplexed signal. In a receiver of the digital communication system, the frame synchronization pattern is detected in order to get a correct understanding of a sequential order in which the digital information signals are multiplexed. A frame synchronization circuit is for putting operation of a timing pulse generator in correct synchronism with the frame synchronization pattern.

A conventional frame synchronization circuit comprises a pattern detecting section for detecting a frame synchronization pattern in an input code sequence supplied to the pattern detecting section. Only when the frame synchronization pattern is detected, the pattern detecting section produces a pattern detection signal or pulse. Supplied with circuit input clock pulses as gate input clock pulses, a gating section allows passage of the gate input clock pulses so as to produce gate output clock pulses and inhibits passage of the gate input clock pulses so as not to produce the gate output clock pulses when controlled by first and second control signals, respectively. In compliance with the gate output clock pulses, a frame pulse generating section generates a frame pulse in each frame period. Supplied with the pattern detection signal and the frame pulse, a concurrency detecting section detects concurrency of the frame pulse with the pattern detection signal and produces the first and the second control signals when the frame pulse is and is not concurrent with the pattern detection signal, respectively.

A little more in general, the frame pulse generating section comprises a timing pulse generator and a frame pulse generator. Each gate output clock pulse is used in stepping the timing pulse generator one step. Stepped in this manner, the timing pulse generator generates various timing pulses. Based on the timing pulses, the frame pulse generator generates the frame pulse. Primarily, the timing pulses are for use in other parts of the receiver.

The frame pulse is generated at a time instant which depends on initial conditions of the timing pulse generator and the frame pulse generator. As a result, generation of the frame pulse is not necessarily concurrent with production of the pattern detection signal. The concurrency detecting section and the gating section are therefore used in adjusting the time instant of generation of the frame pulse by using the frame synchronization pattern so that the receiver may be operable in correct synchronism with the frame synchronization pattern.

It should be noted in connection with the conventional frame synchronization circuit that the pattern detection signal is used in generating the frame pulse through a loop comprising the concurrency detecting section, the gating section, the timing pulse generator, and the frame pulse generator. The loop has a loop delay, which must be shorter than one clock period of the circuit input clock pulses in order that the frame synchronization circuit is correctly operable and that the receiver is consequently correctly operable. When the circuit input clock pulses have a high clock frequency, it becomes impossible to keep the loop delay shorter than one clock period. The conventional frame synchronization circuit has therefore been inoperable depending on the circumstances.

An improved frame synchronization circuit is invented by A. Tomozawa and disclosed in Japanese Patent Publication No. 12,856 of 1975 (Syôwa 50). In the manner which will later be described, the improved frame synchronization circuit is operable with no theoretical restriction on the loop delay. It should, however, be noted as regards the improved frame synchronization circuit that it becomes difficult to manufacture the pattern detecting section. This is because the pattern detecting section must be operable at a high clock frequency and becomes bulky when the frame synchronization pattern is long, namely, has a long pattern length.

SUMMARY OF THE INVENTION

It is therefore an object of the present invention to provide a frame synchronization circuit which is operable even when circuit input clock pulses have a high clock frequency.

It is another object of this invention to provide a frame synchronization circuit which is of the type described and comprises a pattern detecting section excellently operable even at a high clock frequency and moreover even when a frame synchronization pattern has a long pattern length.

It is still another object of this invention to provide a frame synchronization circuit which is of the type described and comprises an excellently operable concurrency detecting section.

Other objects of this invention will become clear as the description proceeds.

On describing the gist of this invention, it is possible to understand that a frame synchronization circuit is for adjusting generation of a frame pulse by using a frame synchronization pattern included in an input code sequence and includes pattern detecting means for detecting the frame synchronization pattern in the input code sequence to produce a pattern detection signal only when the frame synchronization pattern is detected, gating means for allowing passage of gate input clock pulses as gate output clock pulses and inhibiting the passage when supplied with first and second control signals, respectively, frame pulse generating means for generating the frame pulse in compliance with the gate output clock pulses, and concurrency detecting means for detecting concurrency of the frame pulse with the pattern detection signal to produce the first and the second control signals when the concurrency is and is not detected, respectively.

According to this invention, the pattern detecting means of the above-understood frame synchronization circuit comprises: (A) a series-to-parallel converter for converting the input code sequence to first through N-th code sequences with the frame synchronization pattern converted to first through N-th synchronization patterns in the first through the N-th code sequences, where N represents a predetermined integer, the series-to-parallel converter being for frequency dividing circuit input clock pulses by N into the gate input clock pulses; and (B) a pattern detecting circuit for producing first through N-th detection signals collectively as the pattern detection signal only when the first through the N-th synchronization patterns are detected, respectively. In the above-understood frame synchronization circuit, the concurrency detecting means is for producing the first and the second control signals when the frame pulse is and is not concurrent with each of the first through the N-th detection signals. Furthermore, the concurrency detecting means is for producing first through N-th concurrent results when the frame pulse is concurrent with the first through the N-th detection signals. The above-understood frame synchronization circuit comprises a switching circuit for switching a sequential order of the first through the N-th code sequences in accordance with the first through the N-th concurrent results into first through N-th output code sequences.

It may be mentioned here in connection with the gist of this invention that the above-described concurrency detecting means is for additionally producing first through N-th nonconcurrent results when the first through the N-th detection signals are not concurrent with the frame pulse. Under the circumstances, the first control signal starts from build up of one of the first through the N-th concurrent results that is earliest produced as an earliest concurrent result. The second control signal starts from simultaneous production of the first through the N-th nonconcurrent results due to collapse of frame synchronism.

DESCRIPTION OF THE PREFERRED EMBODIMENT

Figure 1:
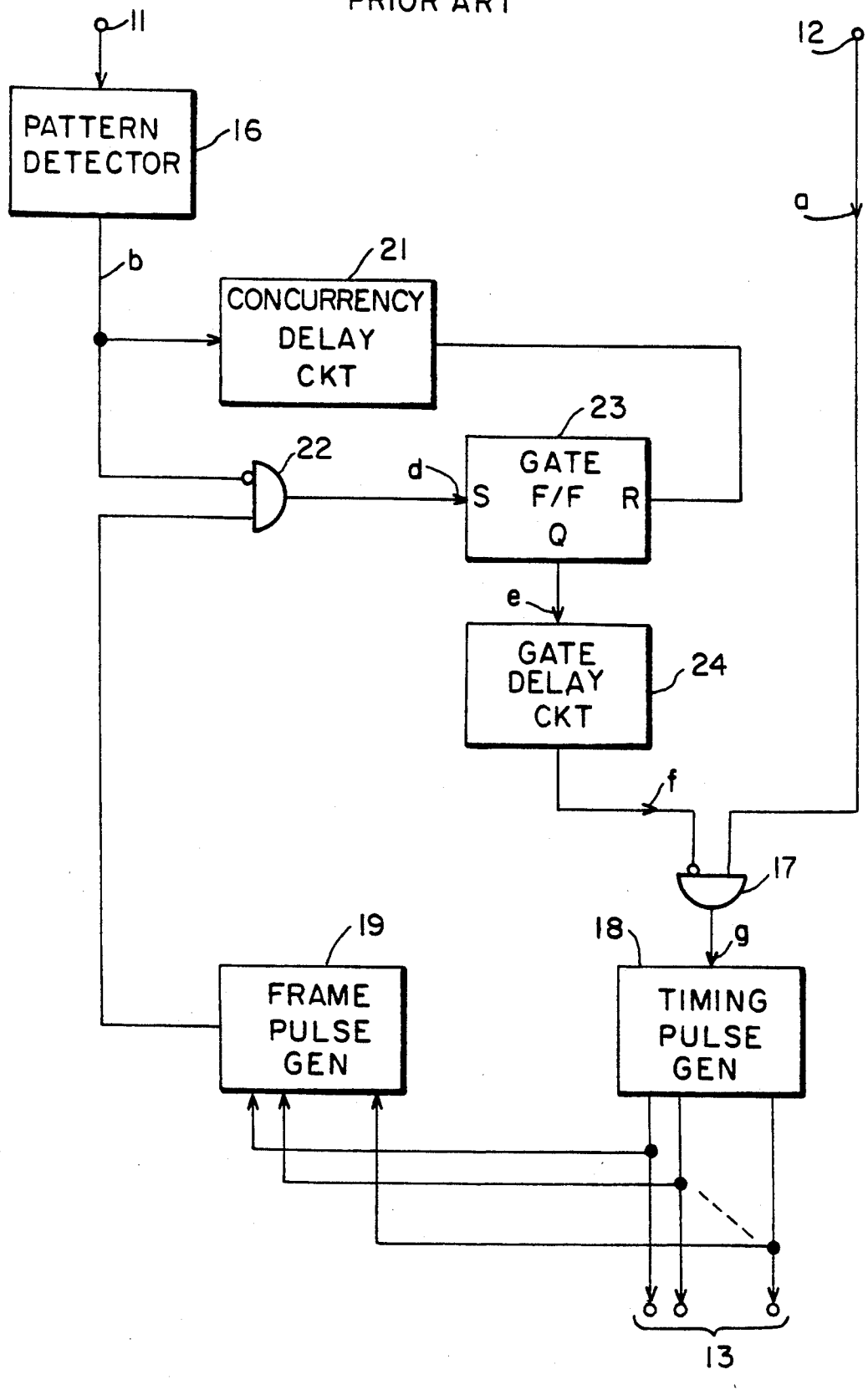
FIG. 1 is a block diagram of a conventional frame synchronization circuit.

Referring to FIG. 1, a conventional frame synchronization circuit will be described in order to facilitate an understanding of the present invention. The conventional frame synchronization circuit is an improved one revealed in the Japanese patent publication referred to hereinabove. Such a frame synchronization circuit is for use in a receiver of a digital communication system, which is typically a PCM communication system.

The frame synchronization circuit has a data input terminal 11 supplied with an input code sequence, a clock input terminal 12 supplied with circuit input clock pulses a, and a plurality of timing pulse output terminals which are collectively indicated at 13 and are usually from several up to a few scores in number. A pattern detector 16 is for detecting a frame synchronization pattern in the input code sequence to produce a pattern detection signal or pulse b only when the frame synchronization pattern is detected.

A clock inhibiting gate 17 is supplied with the circuit input clock pulses as gate input clock pulses and is controlled by a gate control signal which will presently be described. Controlled by the gate control signal, the clock inhibiting gate 17 allows passage of the gate input clock pulses so as to produce gate output clock pulses and inhibits passage of the gate input clock pulses so as not to produce the gate output clock pulses.

Based on the gate output clock pulses, a timing pulse generator 18 generates various receiver timing pulses and delivers them to the timing pulse output terminals 13. The receiver timing pulses are used in other parts of the receiver in the manner known in the art. The receiver timing pulses are furthermore used to make a frame pulse generator 19 generate a frame pulse c in each frame period. In the manner described heretobefore, the frame pulse is generated at a time instant which depends on initial conditions of the timing pulse generator 18 and the frame pulse generator 19.

Giving the pattern detection signal b a concurrency delay which will later become clear, a concurrency delay circuit 21 produces a concurrency delay circuit output signal with a first binary level. When the pattern detection signal disappears, the delay circuit output signal is given a second binary level with the concurrency delay. The first and the second binary levels are typically high and low binary levels. The delay circuit output signal of the high binary level will be called a delayed detection signal.

A concurrency inhibiting gate 22 is supplied with the pattern detection signal b as an inhibit input and with the frame pulse c. When the frame pulse is generated while the pattern detection signal is absent, the inhibiting gate 22 produces a concurrency gate output signal d with the high binary level. Otherwise, the gate output signal has the low binary level. It is therefore possible to understand that the gate output signal is given the high binary level when production of the pattern detection signal b is not concurrent with generation of the frame pulse c.

The delayed detection signal is delivered to a reset input terminal R of a gate flip-flop circuit 23 as a reset input signal. The concurrency gate output signal d of the high binary level is delivered to a set input terminal S of the flip-flop circuit 23 as a set input signal. The flip-flop circuit 23 is therefore left reset from supply of the reset input signal until supply of the set input signal to produce an output signal e at an output terminal Q with a low level and is kept set from supply of the set input signal until supply of the reset input signal to produce the output signal e with a high level. The output signal e of the low and the high levels will be called first and second output signals.

Supplied with the first and the second output signals one at a time, a gate delay circuit 24 supplies the clock inhibiting gate 17 with a delayed signal f as an inhibit input with a gate delay which will later be described. It is now understood that the delayed signal f is the gate control signal described before. When the first and the second output signals are supplied, the delayed signal f has a low and a high logic level and will be called first and second delayed signals. The clock inhibiting gate 17 is therefore released by the first delayed signal to allow passage of the gate input clock pulses as the gate output clock pulses and is inhibited by the second delayed signal to inhibit the passage. The delayed detection signal is alternatively referred to herein as a first control signal until build up of the concurrency gate output signal d. The concurrency gate output signal of the high binary level is referred to herein as a second control signal until build up of the delayed detection signal.

Figure 2:
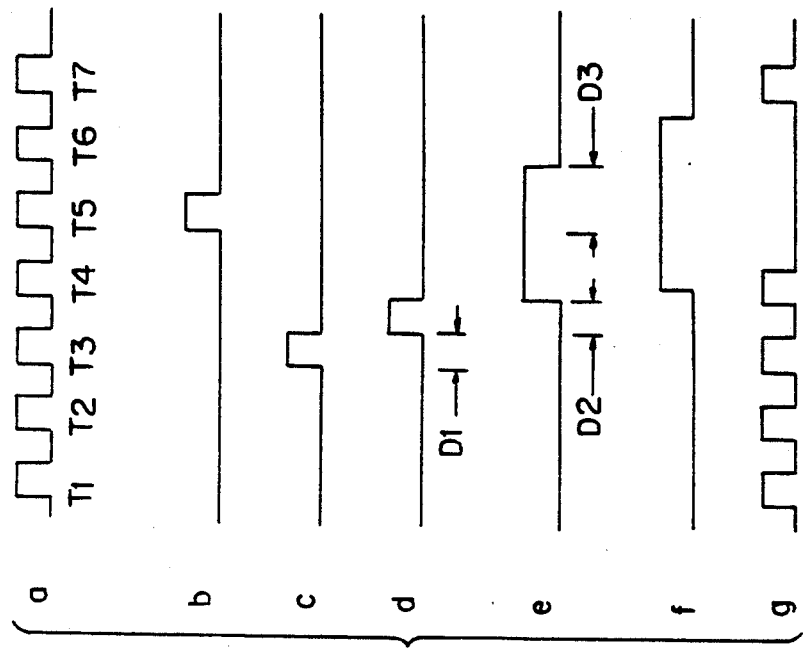
FIG. 2 is a time chart for use in describing operation of the frame synchronization circuit depicted in FIG. 1.

Turning to FIG. 2 with reference to FIG. 1 continued, the circuit input clock pulses "a" are depicted along a first or top row. Attention will be directed to only seven circuit input clock pulses which are depicted merely for convenience of the description as first through seventh clock pulses T1 to T7. It will be surmised in the manner illustrated along a second row that the pattern detection signal b is produced in synchronism with the fifth clock pulse T5. It will furthermore be surmised as depicted along a third row that the frame pulse c is generated at the third clock pulse T3. This means that the timing pulse generator 18 generates the receiver timing pulses out of synchronism with the frame synchronization pattern and should be forcibly stepped so that the frame pulse is generated in synchronism with the frame synchronization pattern.

In accordance with the frame pulse c, the gate output signal d of the high binary level is produced with a first delay D1 in the manner illustrated along a fourth row. As depicted along a fifth row, the output sinal e builds up from the first output signal to the second output signal with a second delay D2 relative to the gate output signal d. The second output signal is therefore produced with a sum delay (D1+D2) relative to the frame pulse c. The second delay D2 is equal to a response time of the gate flip-flop circuit 23.

When the pattern detection signal b is produced, the delayed detection signal makes the second output signal build down back to the first output signal. If the second output signal has a duration comprising the circuit input clock pulses of a number which is equal to a difference between appearance of the frame synchronization pattern in the input code sequence and generation of the frame pulse, namely, two in the example being illustrated, the clock inhibiting gate 17 inhibits the gate input clock pulses of this number to produce the gate output clock pulses in the manner depicted at g along a bottom row. The concurrency delay is therefore selected to be a third delay D3 which is equal to the sum delay (D1+D2). The gate delay circuit 24 is merely for shaping the output signal e so that the second control signal may correctly inhibit passage of the gate input clock pulses through the clock inhibiting gate 17. Incidentally, the delayed signal f is illustrated along a fifth or punultimate row.

Reviewing FIGS. 1 and 2, it is understood that the pattern detector 16 serves as a pattern detecting section for detecting the frame synchronization pattern in the input code sequence to produce the pattern detection signal b only when the frame synchronization pattern is detected. A combination of the gate flip-flop circuit 23, the gate delay circuit 24, and the clock inhibiting gate 17 serves as a gating section for allowing passage of the gate input clock pulses to produce the gate output clock pulses and for inhibiting passage of the gate input clock pulses so as not to produce the gate output clock pulses when controlled by the first and the second control signals, respectively. The gate input clock pulses are the circuit input clock pulses in the improved frame synchronization circuit.

Another combination of the timing pulse generator 18 and the frame pulse generator 19 serves as a frame pulse generating section for generating the frame pulse c in compliance with the gate output clock pulses. It should be noted on continuing the description that the first control signal is produced in response to the pattern detection signal b irrespective of presence and absence of the frame pulse c. It is nevertheless possible to understand in contrast to the second control signal that the first control signal is produced when generation of the frame pulse c is concurrent with production of the pattern detection signal b. In the manner described above in connection with the concurrency gate output signal d of the high binary level, the second control signal is produced when the frame detection signal b is produced while generation of the frame pulse c is not concurrent with production of the pattern detection signal b. A combination of the concurrency delay circuit 21 and the concurrency inhibiting gate 22 is therefore understood as a concurrency detecting section for detecting concurrency of generation of the frame pulse c with production of the pattern detection signal b to produce the first and the second control signals when the concurrency is and is not detected, respectively.

Inasmuch as the gate input clock pulses are inhibited by the gating section (23, 24, 17) so as not to become the gate output clock pulses during a time interval which is equal to a difference in time, if any, between appearance of the frame synchronization pattern in the input code sequence and generation of the frame pulse, the improved frame synchronization circuit is operable with no theoretical restriction on a loop delay of a loop which comprises the concurrency detecting section (21, 22), the gating section, and the frame pulse generating section (18, 19). It, however, becomes difficult to manufacture the pattern detecting section (16) when the circuit input clock pulses have a high clock frequency and moreover when the frame synchronization pattern has a long pattern length.

Figure 3:
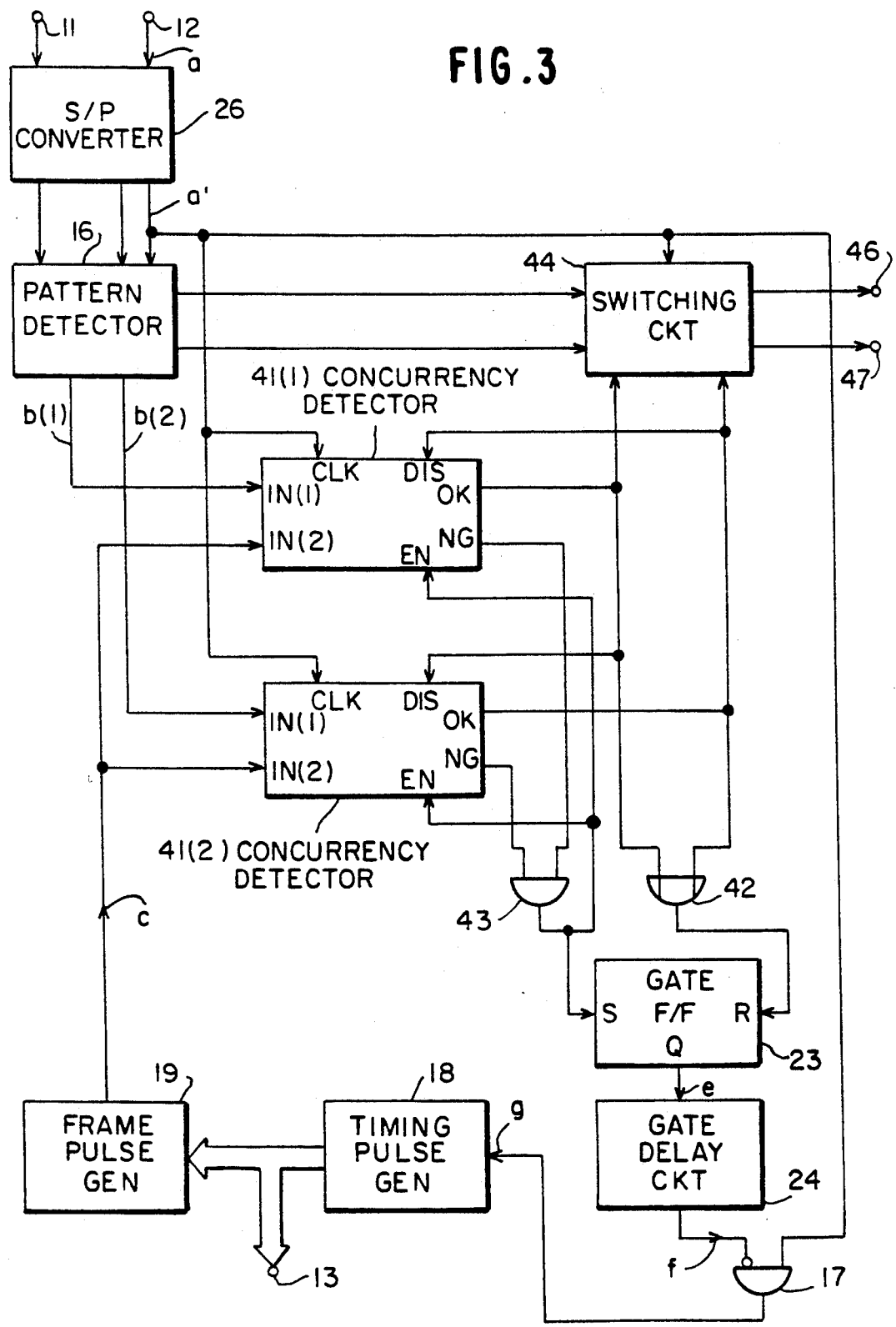
FIG. 3 is a block diagram of a frame synchronization circuit according to an embodiment of the instant invention.

Referring now to FIG. 3, the description will proceed to a frame synchronization circuit according to a preferred embodiment of this invention. The frame synchronization circuit comprises similar parts designated by like reference numerals and are operable with likewise named signals.

The pattern detecting section comprises a series-to-parallel converter 26 besides the pattern detector which is somewhat different from that described in conjunction with FIG. 1 and is referred to herein as a pattern detecting circuit and is designated again by the reference numeral 16 despite the difference. Supplied with the input code sequence from the data input terminal 11 and the circuit input clock pulses "a" from the clock input terminal 12, the series-to-parallel converter 26 produces first through N-th code sequences with the frame synchronization pattern converted to first through N-th synchronization patterns in the first through the N-th code sequences, where N represents a predetermined integer which is not less than two and will be later discussed. The series-to-parallel converter 26 includes a frequency divider (not shown) for frequency dividing the circuit input clock pulses by the predetermined integer to produce the gate input clock pulses which will now be designated by a'. It should be noted in this connection that the gate input clock pulses are used as local timing pulses depending on the circumstances.

Supplied with the gate input clock pulses a' as the local timing pulses, the pattern detecting circuit 16 detects the first through the N-th synchronization patterns to produce first through N-th detection signals b(l) to b(N) collectively as the pattern detection signal mentioned in connection with FIG. 1. It will be assumed in the following merely for simplicity of the description that the predetermined integer N is equal to two. It will furthermore be assumed that the frame synchronization pattern has a pattern length of only two bits and consequently that an n-th synchronization pattern is composed of only one bit, where n is variable between 1 and N, both inclusive. The first through the N-th detection signals are therefore first and second pattern detection signals or pulses b(1) and b(2). In addition, the pattern detecting circuit 16 produces the first and the second code sequences as first and second output sequences including the first and the second synchronization patterns as first and second frame synchronization bits F1 and F2.

Figure 4:
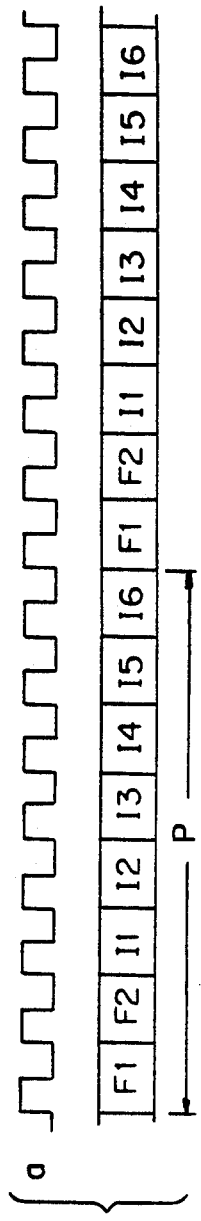
FIG. 4, drawn below FIG. 2 merely for convenience of illustration, exemplifies a format of an input code sequence for use in a frame synchronization circuit in general.

Turning to FIG. 4 during a short while, the circuit input clock pulses "a" are illustrated along an upper row. In the manner exemplified along a lower row, the input code sequence includes a first part having a length of a frame period P and a second part following the first part. The first part will be called a preceding frame. The second part is in another frame period and will be called a succeeding frame. The preceding and the succeeding frames include a common frame synchronization pattern. In the example being illustrated, first through sixth information bits I1 to I6 follow the frame synchronization bits F1 and F2 in each frame. Although designated by common reference symbols, the information bits are different in general from a frame to another frame.

Figure 5:
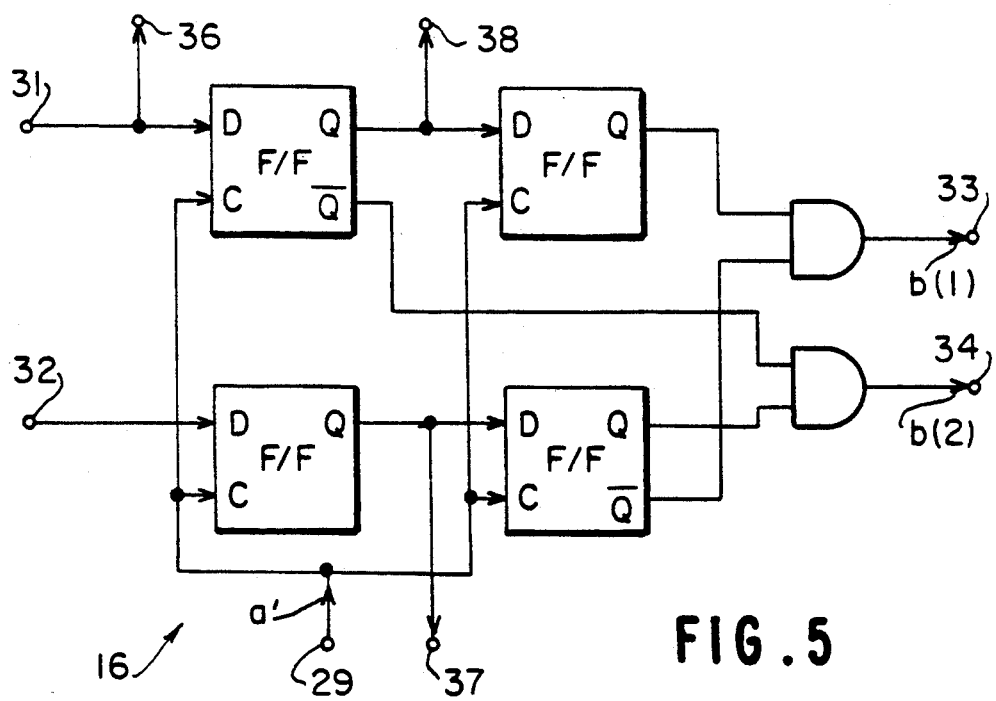
FIG. 5 is a block diagram of a pattern detecting circuit for use in the frame synchronization circuit shown in FIG. 3.

Further turning to FIG. 5 with FIG. 3 additionally referred to, the pattern detecting circuit 16 has a timing pulse input terminal 29, first and second data input terminals 31 and 32, first and second detection signal output terminals 33 and 34, and first through third data output terminals 36, 37, and 38. In the illustrated example, the pattern detecting circuit 16 comprises four flip-flop circuits connected to the first and the second data input terminals 31 and 32 and to the first through the third data output terminals 36 to 38 as shown and first and second AND gates connected to three of the flip-flop circuits and to the first and the second detection signal output terminals 33 and 34 in the manner depicted.

From the series-to-parallel converter 26, the local timing pulses a' are delivered to the timing pulse input terminal 29. The first and the second code sequences are delivered to the first and the second data input terminals 31 and 32. In connection with the first and the second code sequences and consequently with the first and the second pattern detection signals b(1) and b(2) and with the first and the second output sequences, it should be noted that there are first and second cases depending on an initial condition of the frequency divider included in the series-to-parallel converter 26.

Figure 6:
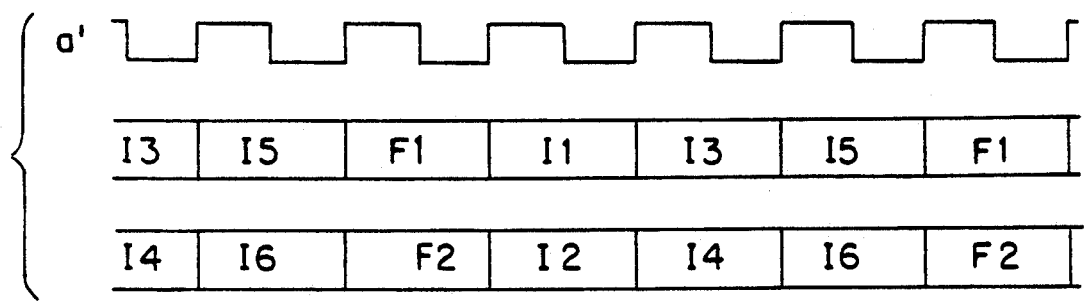
FIGS. 6 (A) and (B) show two cases of a combination of first and second code sequences which are used in the frame synchronization circuit illustrated in FIG. 3.
Figure 6:
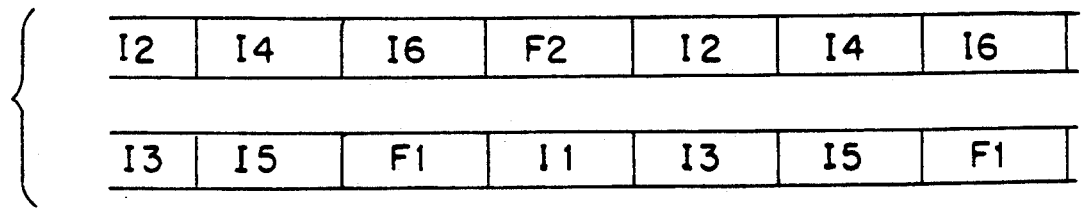

Turning now to FIG. 6(A) with reference to FIG. 5 continued, the local timing pulses a' are illustrated along a first or top row in common to FIG. 6(B). Attention will be directed to the first case. The first code sequence consists of the first frame synchronization bit F1 and the first, the third, and the fifth information bits I1, I3, and I5 in the manner depicted along a second or middle row. The second code sequence consists of the second frame synchronization bit F2 and the second, the fourth, and the sixth information bits I2, I4, and I6 as illustrated along a third or bottom row. The first and the second frame synchronization bits F1 and F2 appear simultaneously in the respective code sequences. In this case, the pattern detecting circuit 16 produces only one of the first and the second detection signals b(1) and b(2) by detecting one of two different ones of the frame synchronization bits F1 and F2, namely, either the first frame synchronization bit F1 or the second frame synchronization bit F2. This, however, depends on the predetermined pattern used as the frame synchronization pattern. It is therefore said herein that the first and the second detection signals b(1) and b(2) are produced when the first and the second frame synchronization bits F1 and F2 are detected by the respective AND gates.

In FIG. 6(B), the second case is illustrated. The first code sequence consists of the second frame synchronization bit F2 and the second, the fourth, and the sixth information bits I2, I4, and I6 in the manner depicted along an upper row. The second code sequence consists of the first frame synchronization bit F1 and the first, the third, and the fifth information bits I1, I3, and I5 as illustrated along a lower row. The first and the second detection signals b(1) and b(2) are produced when the second and the first frame synchronization bits F2 and F1 are detected by the respective AND gates. It will be understood that the second frame synchronization bit F2 appears in the first code sequence in synchronism with appearance of the first information bit I1 in the second code sequence. It should furthermore be understood clearly in this connection that the pattern detecting circuit 16 does not take the first and the second synchronization bits F1 and F2 separately into consideration but detects the frame synchronization pattern by directing attention to a relative time relationship between the first and the second frame synchronization bits F1 and F2.

Turning back to FIG. 3, the first and the second pattern detection signals b(1) and b(2) are delivered to a first input terminal IN(1) of a first concurrency detector 41(1) and to a first input terminal IN(1) of a second concurrency detector 41(2). The frame pulse c is delivered to a second input terminal IN(2) of each of the first and the second concurrency detectors 41 (suffixes omitted).

The first concurrency detector 41(1) detects concurrency of generation of the frame pulse c with production of the first pattern detection signal b(1) to produce a first concurrent result at a concurrent result terminal OK and a first nonconcurrent result at a nonconcurrent result terminal NG when generation of the frame pulse is concurrent with production of the first pattern detection signal and when the first pattern detection signal is produced during generation of no frame pulse, namely, while generation of the frame pulse is not concurrent with production of the first pattern detection signal. The second concurrency detector 41(2) likewise detects concurrency of the frame pulse with the second pattern detection signal and similarly produces a second concurrent result at a concurrent result terminal OK and a second nonconcurrent result at a nonconcurrent result terminal NG when the frame pulse is and is not concurrent with the second pattern detection signal.

The first concurrent result is delivered to a disable input terminal DIS of the second concurrency detector 41(2). The second concurrent result is delivered to a disable input terminal DIS of the first concurrency detector 41(1). When disabled by the concurrent result produced by one of the concurrency detectors 41, the other of the concurrency detectors 41 is put in a disabled state of not producing the concurrent result.

The first and the second concurrent results are delivered to an OR gate 42 for producing an OR output signal, which is supplied to the gate flip-flop circuit 23 as the first control signal. The first and the second nonconcurrent results are delivered to an AND gate 43 for producing an AND output signal, which is supplied to the gate flip-flop circuit 23 as the second control signal. The AND output signal is furthermore delivered to an enable input terminal EN of each of the first and the second concurrency detectors 41 to enable the above-mentioned other of the concurrency detectors 41 by releasing the disabled state of the concurrency detector 41 under consideration. The first and the second concurrent results are supplied to a switching circuit 44 for switching a sequential order or channels of the first and the second output sequences in the manner which will later become clear.

Figure 7:
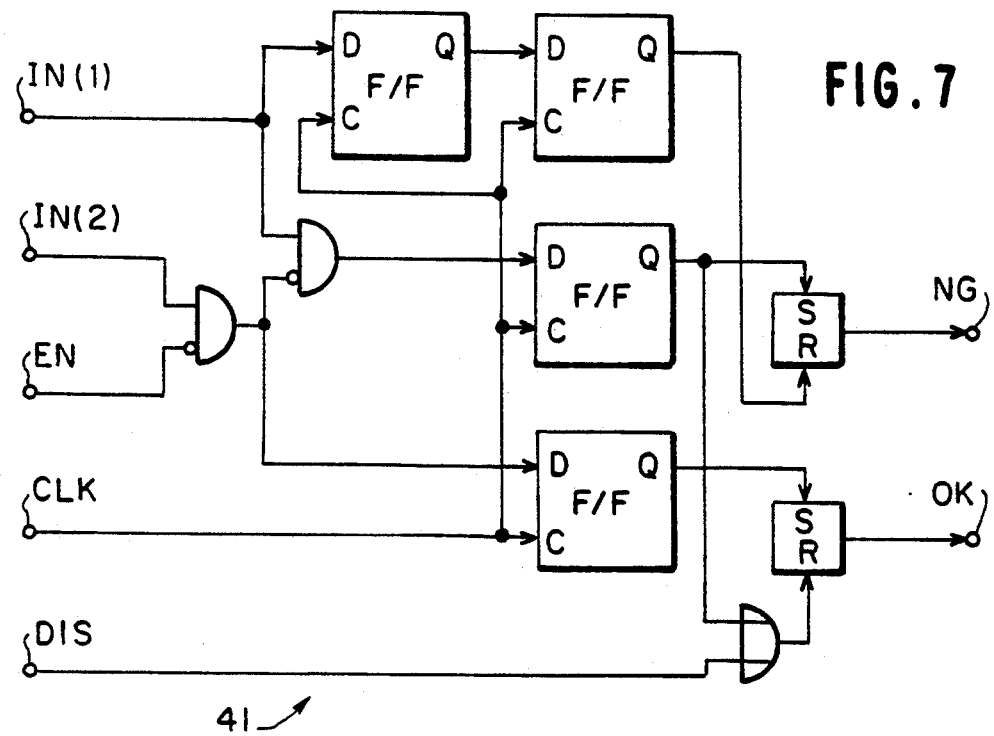
FIG. 7 is a block diagram of a concurrency detector for use in the frame synchronization circuit shown in FIG. 3.

Turning temporarily to FIG. 7, each of the first and the second concurrency detectors 41 has a timing pulse input terminal CLK supplied with the local timing pulses a', the first and the second input terminals IN(1) and IN(2), the enable and the disable input terminals EN and DIS, and the concurrent and the nonconcurrent result terminals OK and NG. Each concurrency detector 41 comprises two inhibiting gates, an OR gate, and six flip-flop circuits which are connected together and to the input and the output terminals in the manner illustrated.

Referring to FIGS. 3 and 5 through 7, it will be presumed that the first and the second frame synchronization bits F1 and F2 have high and low binary levels. The first case will first be taken into consideration. The pattern detecting circuit 16 delivers the first pattern detection signal b(1) with a high logic level from the first AND gate to the first detection signal output terminal 33 when the first frame synchronization bit F1 is detected in the first code sequence supplied to the first data input terminal 31. In this event, the second AND gate delivers the second pattern detection signal b(2) with a low logic level to the second detection signal output terminal 34 even when the second frame synchronization bit F2 is detected in the second code sequence supplied to the second data input terminal 32.

The first concurrency detector 41(1) may produce the nonconcurrent result at first, for example, during the preceding frame. The second concurrency detector 41(2) produces the nonconcurrent result. The first and the second concurrency detectors 41 are therefore kept enabled. In the succeeding frame, generation of the frame pulse c becomes concurrent with appearance of the first and the second frame synchronization bits F1 and F2 in the first and the second code sequences and consequently with production of the first and the second pattern detection signals b(1) and b(2). Inasmuch as the first pattern detection signal b(1) alone is given the high logic level, the first concurrency detector 41(1) produces the concurrent result earlier than the second concurrency detector 41(2). As a result, the first concurrency detector 41(1) remains in an enabled state of capable of repeatedly producing the concurrent result in successive frame periods and disables the second concurrency detector 41(2), which is kept in the disabled state until enabled when the first concurrency detector 41(1) happens to produce the nonconcurrent result due to collapse of the frame synchronism for some reason or another. Under the circumstances, the AND output signal becomes to have the high logic level. Stated otherwise, the first and the second concurrency detectors 41 are enabled when the first and the second nonconcurrent results are simultaneously produced.

The second case will now be taken into consideration. The first frame synchronization bit F1 appears in the second code sequence one timing pulse period earlier than appearance of the second frame synchronization bit F2 in the first code sequence. The pattern detecting circuit 16 delivers the second pattern detection signal b(2) with the high logic level from the second AND gate to the second detection signal output terminal 34 when the first frame synchronization bit F1 is detected in the second code sequence supplied to the second data input terminal 32. In this event, the first AND gate delivers the first pattern detection signal b(1) with the low logic level to the first detection signal output terminal 33 when the first frame synchronization bit F1 is detected one timing pulse period later in the first code sequence supplied to the first data input terminal 31.

The first concurrency detector 41(1) produces the nonconcurrent result. The second concurrency detector 41(2) may produce the nonconcurrent result at first. In due course, generation of the frame pulse c becomes concurrent with appearance of the first frame synchronization bit F1 in the second code sequence and consequently with production of the second pattern detection signal b(2) of the high logic level. The second concurrency detector 41(2) therefore produces the concurrent result earlier than the first concurrency detector 41(1). As a result, the second concurrency detector 41(2) remains in an enabled state of capable of repeatedly producing the concurrent result in successive frame periods and disables the first concurrency detector 41(1), which is kept in the disabled state until enabled when the second concurrency detector 41(2) happens to produce the nonconcurrent result due to collapse of frame synchronism for some reason or another. The first and the second concurrency detectors 41 are enabled by the AND output signal of the high logic level.

Referring more particularly to FIG. 3, it will be understood as regards the gating section (23, 24, 17) that the gate delay circuit 24 is not essential to its operation. The first and the second delayed signals may therefore be referred to as the first and the second output signals. It is possible in this event to understand that a combination of the gate flip-flop circuit 23 and the gate delay circuit 24 serves as a flip-flop unit for producing the first and the second output signals when reset by the first control signal and when set by the second control signal, respectively.

Controlled by the first or the second concurrent result produced by one of the first and the second concurrency detectors 41 that remains in the enabled state, the switching circuit 44 switches the sequential order of the first and the second output sequences into first and second output code sequences. In the example being illustrated, the first and the second output sequences are produced, in the first case, as the first and the second output code sequences with the sequential order left untouched. In the second case, the first and the second output sequences are produced as the second and the first output code sequences with the sequential order switched. The first and the second output code sequences are delivered to first and second data output terminals 46 and 47.

Figure 8:
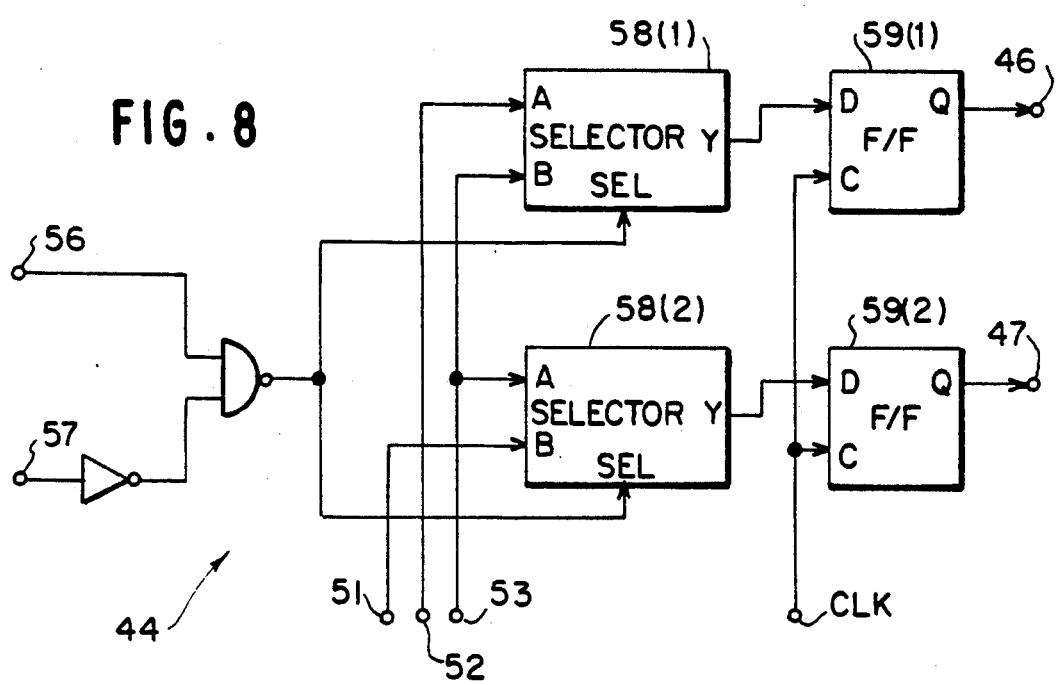
FIG. 8 is a block diagram of a switching circuit for use in the frame synchronization circuit depicted in FIG. 3.

Turning to FIG. 8 with reference to FIG. 3 continued and with FIG. 5 additionally referred to, the switching circuit 44 has a timing pulse input terminal CLK, first through third data input terminals 51, 52, and 53, first and second result input terminals 56 and 57, and the first and the second data output terminals 46 and 47. The first and the second output sequences are supplied from the first to the third data output terminals 36 through 38 to the first through the third data input terminals 51 to 53. The first and the second concurrent results are supplied from the concurrent result terminals OK's of the first and the second concurrency detectors 41 to the first and the second result input terminals 56 and 57.

In the switching circuit 44 exemplified in FIG. 8, a NAND gate is connected to the first result input terminal 56 directly and to the second result input terminal 57 through an inverter to produce a selection signal SEL, which has low and high binary levels when the first and the second concurrent results are produced. Each of first and second selectors 58(1) and 58(2) has a selection input terminal SEL, first and second input terminals A and B, and an output terminal Y. The selection signal is supplied to the selection input terminals of the first and the second selectors 58 (suffixed omitted). When the selection signal has the low and the high binary levels, the selectors 58 select signals supplied to the first and the second input terminals A and B, respectively. The first input terminal A of the first selector 58(1) is connected to the second data input terminal 53. The second input terminal B of the second selector 58(2) is connected to the first data input terminal 51. The second input terminal B of the first selector 58(1) and the first input terminal A of the second selector 58(2) are connected in common to the third data input terminal 52.

Each of first and second flip-flop circuits 59(1) and 59(2) has C and D input terminals and a Q output terminal. The C input terminals of the first and the second flip-flop circuits 59 (suffixes omitted) are connected in common to the timing pulse input terminal CLK. The D input terminals of the first and the second flip-flop circuits 59 are connected to the output terminals Y of the first and the second selectors 58. The Q output terminals of the first and the second flip-flop circuits 59 are connected to the first and the second data output terminals 46 and 47.

Figure 9A:
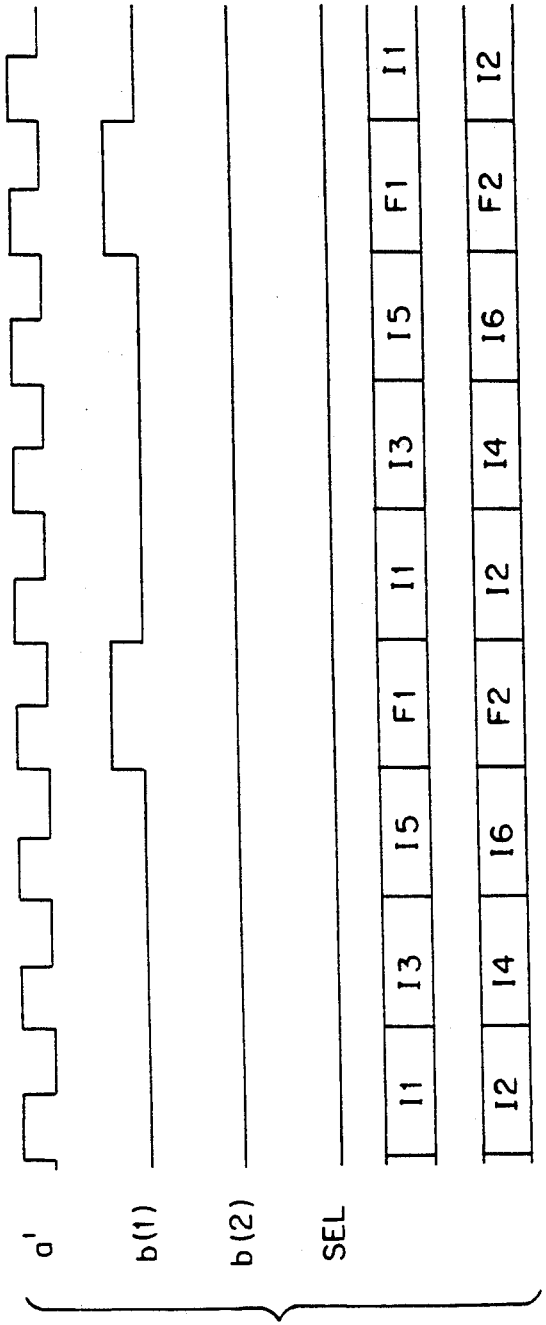
FIGS. 9 (A) and (B) are time charts for use in describing operation of the pattern detecting circuit shown in FIG. 5 and of the switching circuit illustrated in FIG. 8.
Figure 9B:
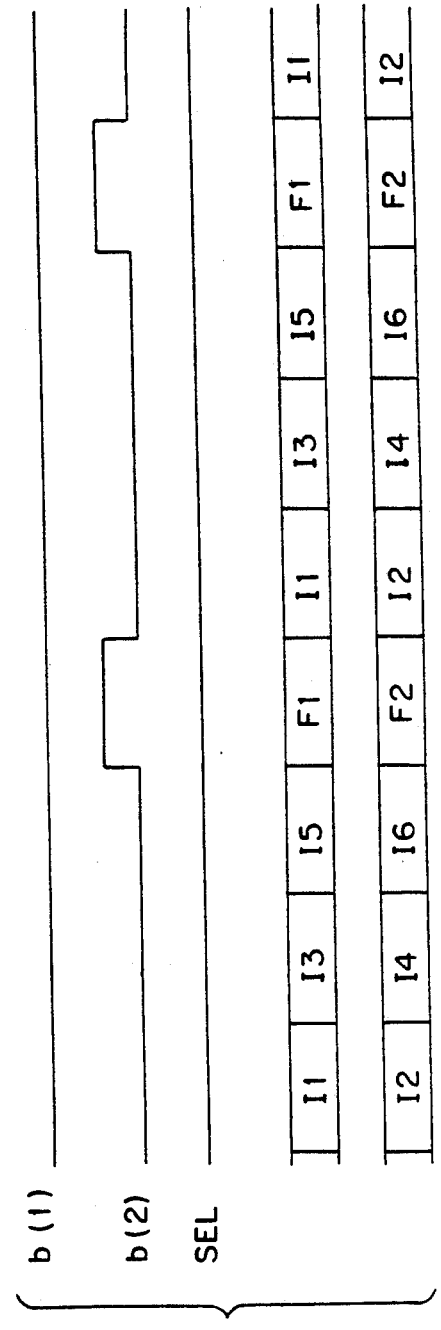

Referring to FIG. 9 (A) with FIGS. 5, 7, and 8 referred to, the local timing pulses a' are depicted along a first or top row in common to FIG. 9 (B). Attention will be directed to the first case. The first and the second pattern detection signals b(1) and b(2) are illustrated along second and third rows. The first and the second concurrent results are produced with the high and the low logic levels. The selection signal therefore keeps the low logic level as depicted along a fourth row. The first and the second output code sequences are therefore delivered to the first and the second data output terminals 46 and 47 in the manner depicted along a fifth row and a sixth or bottom row.

In FIG. 9 (B), the second case is illustrated. The first and the second pattern detection signals b(1) and b(2) are depicted along a first or top and a second row. The first and the second concurrent results are produced with the low and the high logic levels. The selection signal therefore keeps the high logic level as depicted along a third row. The first and the second output code sequences are delivered to the first and the second data output terminals 46 and 47 in the manner illustrated along a fourth and a fifth or bottom row.

Reviewing FIGS. 3 and 5 through 9, a combination of the first and the second concurrency detectors 41, the OR gate 42, and the AND gate 43 serves as a concurrency detecting section. Supplied with the frame pulse c and the first and the second pattern detection signals b(1) and b(2), the concurrence detecting section (41, 42, 43) produces the first and the second nonconcurrent results when the pattern detection signals are produced nonconcurrent, namely, out of concurrency, with the frame pulse due to, for example, collapse of frame synchronism.

One of the first and the second pattern detection signals, such as the first pattern detection signal b(1) in FIG. 9 (A) or the second pattern detection signal b(2) in FIG. 9 (B), is produced earliest as an earliest detection signal in each frame period. In the concurrency detecting section, one of the first and the second concurrency detectors 41 produces one of the first and the second concurrent results as an earliest concurrent result to serve as a particular concurrency detector when the earliest pattern detection signal is produced concurrent with generation of the frame pulse. The particular concurrency detector remains in the enabled state described above with reference to FIGS. 3 and 5 through 7 and puts the other of the concurrency detectors 41 in the disabled state described before by turning back to FIG. 3.

Although the concurrency detecting section produces in this manner only one of the first and the second concurrent results as the earliest concurrent result, whichever one of the first and the second concurrency detectors 41 may serve as the particular concurrency detector depending on the first and the second synchronization patterns. It may therefore be said that the concurrency detecting section is capable of producing the first and the second concurrent results, namely, is for producing the first and the second concurrent results, when generation of the frame pulse c is concurrent with production of the first and the second pattern detection signals b(1) and b(2).

Incidentally, the first control signal starts from production of the earliest concurrent result and ends at simultaneous production of the first and the second nonconcurrent results. The second control signal starts from the simultaneous production of the first and the second nonconcurrent results and ends at later production of the earliest concurrent result.

FIGS. 1 through 9 will now be reviewed. The predetermined integer N may be equal to three or more. It should be noted in this connection that the frame synchronization pattern of a long pattern length is desirable when rapid restoration of the frame synchronism is important. This, however, results in the pattern detector 16 of a complicated structure and in restricted clock frequency of the circuit input clock pulses used therein. Generally speaking, the pattern detector or the pattern detecting circuit 16 is operable at as high a clock frequency as about 500 MHz at present. Only about four bits have therefore been used as the pattern length of the frame synchronization pattern in a conventional frame synchronization circuit.

On the other hand, the series-to-parallel converter 26 is simpler in structure than the pattern detector 16 and is operable at a higher clock frequency of about 2.5 GHz. Use of the predetermined integer N makes it possible to lengthen the pattern length and to use the local timing pulses having a highest possible clock frequency.

Preferably, the predetermined integer N should be less than twice the number of bits in each frame synchronization pattern and should be an integral submultiple of the number of bits in each frame period. In general, the pattern detecting circuit 16 is less power consuming, more highly integrated, and lower priced when put into operation at a lower clock frequency. Selection of a greater number as the predetermined integer, however, results in a frame synchronization circuit of a larger scale. These factors should therefore be taken into consideration on actually determining the predetermined integer. The predetermined integer of eight and the pattern length of thirty-two bits were used in frame synchronization circuits which were actually manufactured according to this invention and were tested.

It will be understood from the description so far made that the pattern detecting circuit 16 of FIG. 5 is operable when the frame synchronization pattern consists of the first frame synchronization bit F1 of the high binary level and the second frame synchronization bit F2 of the low binary level. The pattern detecting circuit 16 may comprise first through N-th shift registers and a plurality of AND gates in the manner known in the art. In any event, the pattern detecting circuit 16 should have a structure which is applicable to the predetermined pattern used as the frame synchronization pattern. Depending on the frame synchronization pattern, the pattern detecting circuit 16 detects one of different ones of the first through the N-th synchronization patterns earliest in each frame period of the input code sequence to produce the above-mentioned earliest detection signal when that one of the different ones of the first through the N-th synchronization patterns is detected. It should be noted that there are first through N-th cases in connection with a combination of the first through the N-th code sequences and consequently with a combination of the first through the N-th synchronization patterns.

The concurrency detecting section (41, 42, 43) should comprise first through N-th concurrency detectors 41 instead of only first and second concurrency detectors. The disable input terminal DIS of each of the first through the N-th concurrency detectors 41 should be supplied through an OR gate (not shown) with the concurrent result produced by any one of the first through the N-th concurrency detectors 41. In other respects, the concurrency detecting section is not different in principle from that described in conjunction with FIGS. 3 and 5. The fact should clearly be noted in this connection that the concurrency detecting section is excellently operable despite conversion of the input code sequence to the first through the N-th code sequences. This is because one of the first through the N-th concurrency detectors 41 disables (N−1) remaining ones of the concurrency detectors 41 as soon as the earliest concurrent result is produced by that one of the concurrency detectors 41.

The switching circuit 44 should switch the sequential order of first through N-th output sequences which are produced by the pattern detecting section (26, 16) together with the first through the N-th synchronization patterns. It should be noted in this connection that the first through the N-th output sequences are produced in connection with the first through the N-th cases. It is nevertheless believed that the switching circuit 44 is readily implemented when attention is directed to the fact that the first through the N-th cases are automatically discriminated from one another by the earliest concurrent result produced by the concurrency detecting section.

While this invention has thus far been described in specific conjunction with a sole preferred embodiment thereof and its application to a general case where the predetermined integer N is equal to three or more, it will now be readily possible for one skilled in the art to understand other applications. For example, at least one of the first through the N-th synchronization patterns may consist of two or more frame synchronization bits. Even in this event, it will readily be possible to implement the pattern detecting circuit 16, the switching circuit 44, and the like.

What is claimed is:

1. A frame synchronization circuit for adjusting generation of a frame pulse by using a frame synchronization pattern included in an input code sequence, said frame synchronization circuit comprising:

a series-to-parallel converter for converting said input code sequence to first through N-th code sequences with said frame synchronization pattern converted to first through N-th synchronization patterns in said first through said N-th code sequences, where N represents a predetermined integer, said series-to-parallel converter being for frequency dividing circuit input clock pulses by N into gate input clock pulses;

a pattern detecting circuit for producing first through N-th detection signals collectively as said pattern detection signal only when said first through said N-th synchronization patterns are detected, respectively, and for outputting said first through N-th code sequences received from said series-to-parallel converter;

first through N-th concurrency detectors supplied with said frame pulse and said first through said N-th detection signals, respectively, for detecting concurrency of said frame pulse with said first through said N-th detection signals to produce first through N-th concurrent results, one of said first through N-th concurrency detectors generating a first concurrent result as an earliest concurrent result and means responsive to said first concurrent result for causing the remaining concurrency detectors to be disabled;

gate means for allowing passage of said gate input clock pulses as gate output clock pulses and for inhibiting passage of said gate input clock pulses in accordance with said first through said N-th concurrent results, said gate means allowing passage of said gate input clock pulses when said gate means receives one of said first through said N-th concurrent results;

frame pulse generating means for generating said frame pulse in compliance with said gate output clock pulses; and a switching circuit for switching a sequential order of said first through said N-th code sequences received from said pattern detecting circuit in accordance with said first through said N-th concurrent results into first through N-th output code sequences.

2. A frame synchronization circuit as claimed in claim 1, wherein said first through said N-th concurrency detectors produce first through N-th noncurrent results when said first through said N-th detection signals are produced nonconcurrent with said frame pulse.

3. A frame synchronization circuit as claimed in claim 2, wherein:
said pattern detecting circuit is for producing one of said first through said N-th detection signals first earliest as an earliest detection signal;
said concurrency detectors being for producing said earliest concurrent result when said frame pulse is concurrent with said earliest detection signal;
said switching circuit being for switching said sequential order in accordance with said earliest concurrent result.

4. A frame synchronization circuit as claimed in claim 3, wherein each of said first through said N-th concurrency detectors has an enable input terminal and a disable input terminal and a concurrent result terminal and a nonconcurrent result terminal, said concurrent result terminal being connected to the disable input terminal of at least one other of said concurrency detectors, said first through said N-th concurrent results being output at the concurrent result terminal of each of said first through said N-th concurrency detectors, said first through said N-th nonconcurrent results being output at the nonconcurrent result terminal of each of said first through said N-th concurrency detectors, one of said first through said N-th concurrency detectors being supplied with said earliest detection signal to serve as a particular concurrency detector for producing said earliest concurrent result and to remain in an enabled state capable of producing either one of said first through said N-th concurrent results and of said first through said N-th nonconcurrent results, wherein at least one of said first through said N-th concurrency detectors is disabled by said earliest concurrent result so as to produce none of said first through said N-th concurrent results and so as to produce at least one of said first through said N-th nonconcurrent results.

5. A frame synchronization circuit as claimed in claim 3, wherein said pattern detecting circuit is for detecting one of different ones of said first through said N-th synchronization patterns earliest in each frame period of said input code sequence to produce said earliest detection signal when said one of the different ones is detected.

6. A frame synchronization circuit as claimed in claim 1, said frame synchronization pattern being a first predetermined number of bits long, said input code sequence having a frame period which is a second predetermined number of bits long, wherein said predetermined integer indicating a number N of said first through said N-th code sequences is less than twice said first predetermined number and is an integral multiple of said second predetermined number.

7. A frame synchronization circuit as claimed in claim 6, wherein said predetermined integer is equal to eight, said frame synchronization pattern being thirty-two bits long, each of said first synchronization pattern through an eighth synchronization pattern being four bits long.

8. A frame synchronization circuit as claimed in claim 4, wherein said gate means comprises:
an OR gate connected to the concurrent result terminal of each of said first through said N-th concurrency detectors to produce an OR output signal of said first through said N-th concurrent results as a first control signal;
an AND gate connected to the nonconcurrent result terminal of each of said first through said N-th concurrency detectors and to the enable input terminal of each of said first through said N-th concurrency detectors to produce an AND output signal of said first through said N-th nonconcurrent results as a second control signal, said AND output signal enabling said first through said N-th concurrency detectors capable of producing said first through said N-th concurrent results and said first through said N-th nonconcurrent results;
a flip-flop unit for producing first and second output signals when reset by said first control signal and when set by said second control signal, respectively; and
an inhibiting gate released by said first output signal to allow passage of said gate input clock pulses so as to produce said gate output clock pulses and inhibited by said second output signal to inhibit passage of said gate input clock pulses so as not to produce said gate output clock pulses.

* * * * *